June 26, 1973  F. F. HORNE  3,741,807
SEWER TREATMENT TO KILL TREE ROOTS AND
OTHER ORGANIC GROWTH THEREWITHIN
Filed March 10, 1971  4 Sheets-Sheet 1
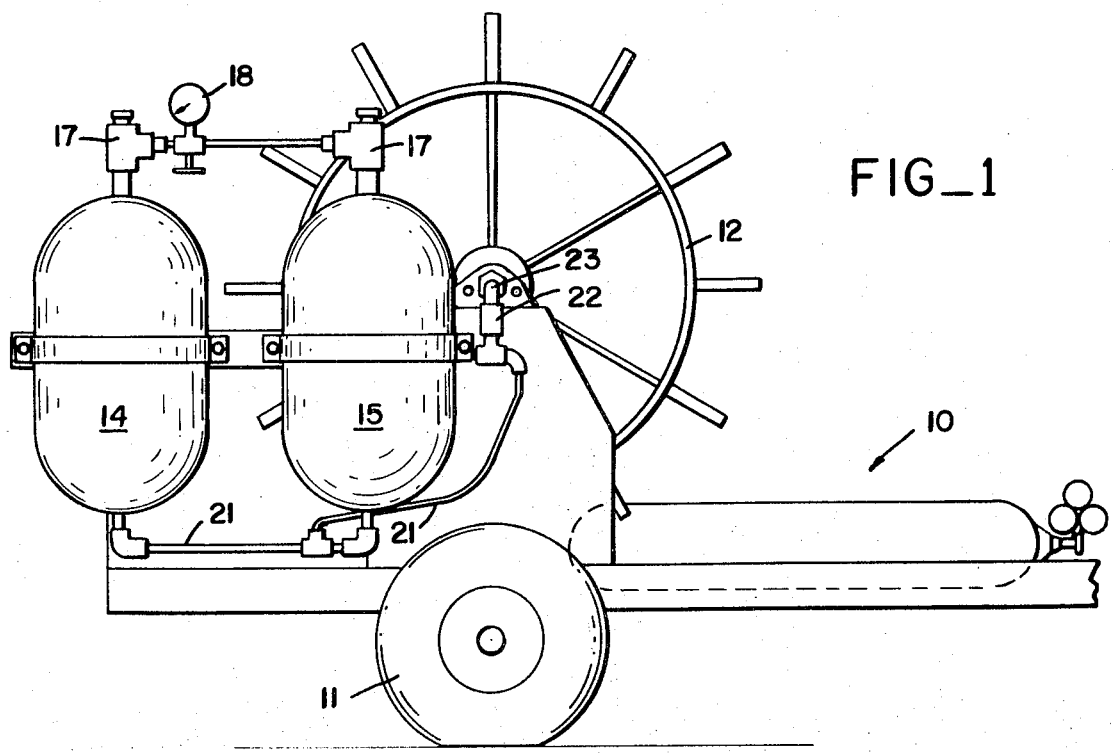
FIG_1
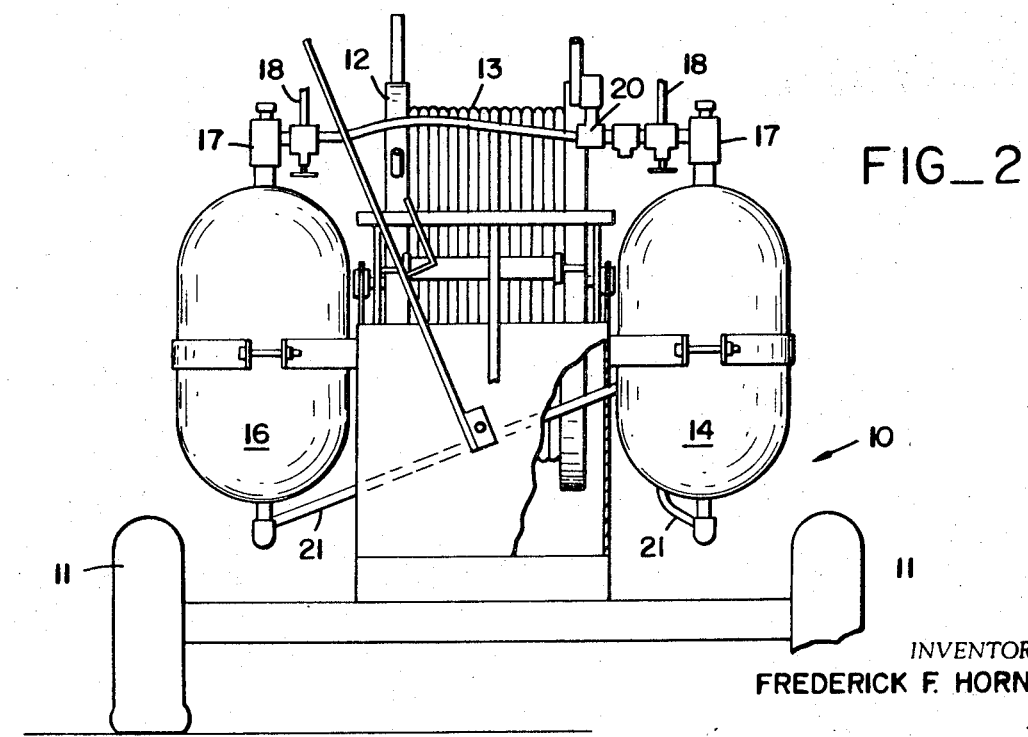
FIG_2
INVENTOR.
FREDERICK F. HORNE
ATTORNEYS

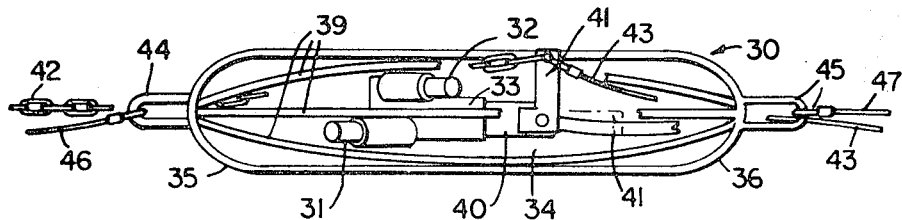
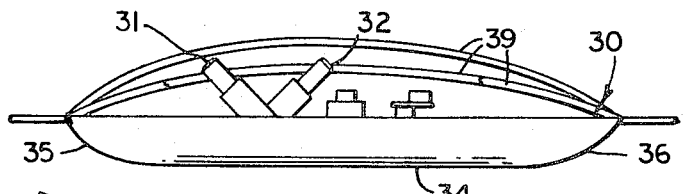
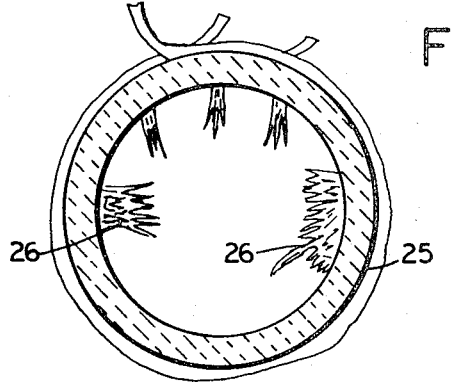
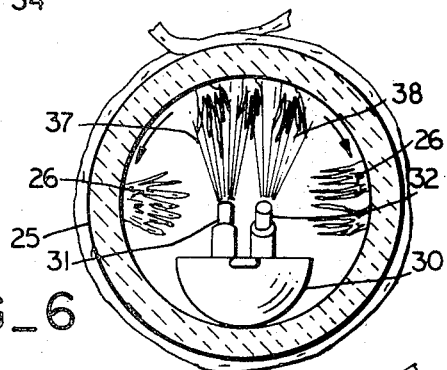
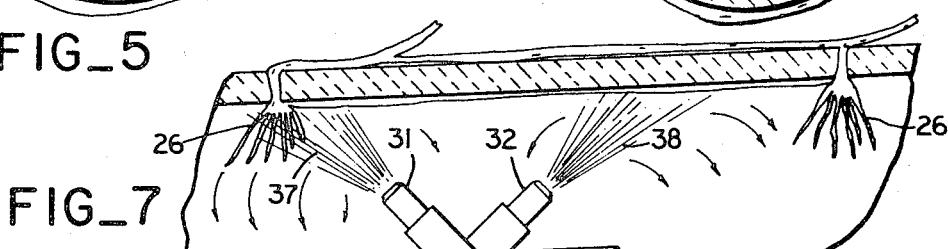
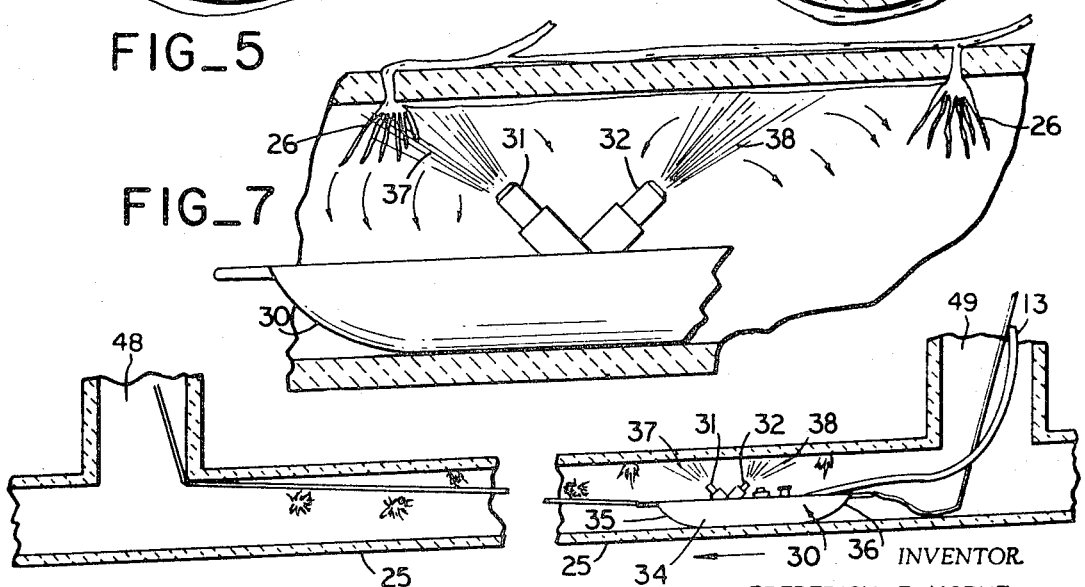

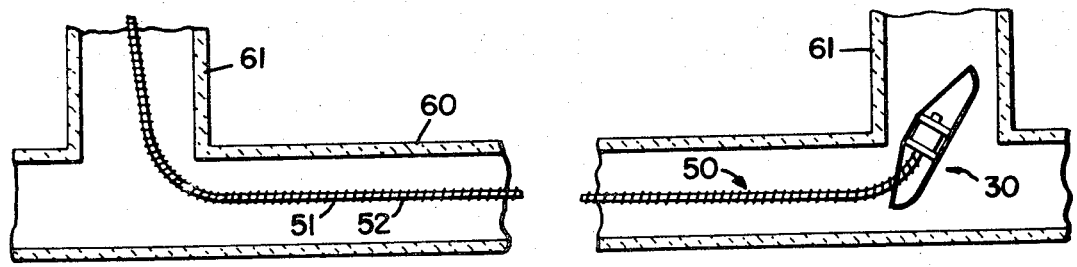
FIG_9
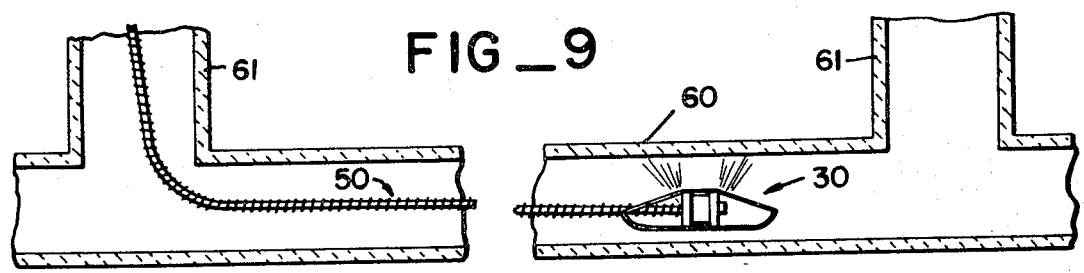
FIG_10
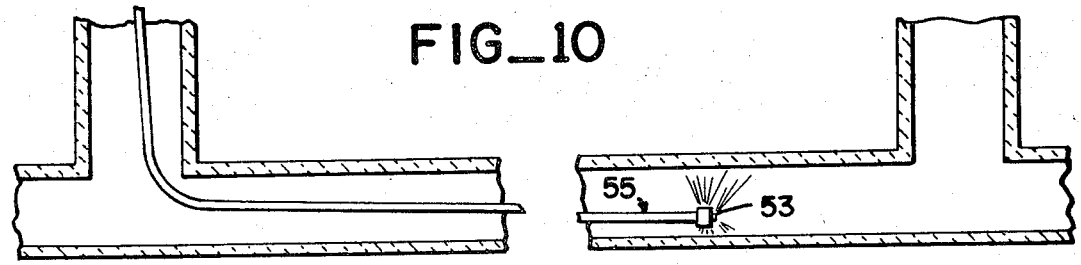
FIG_11
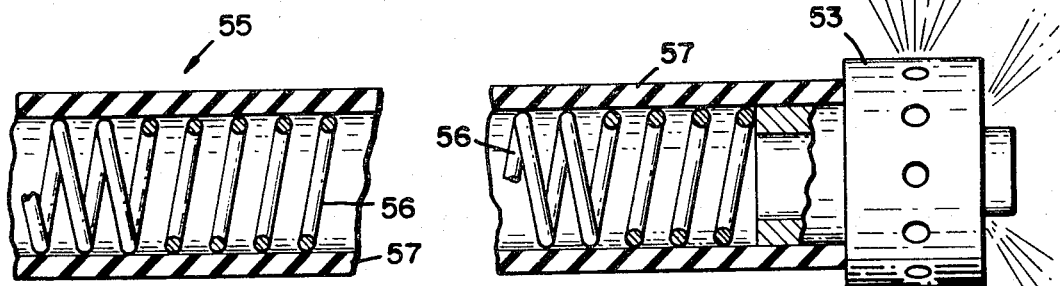
FIG_13   FIG_14
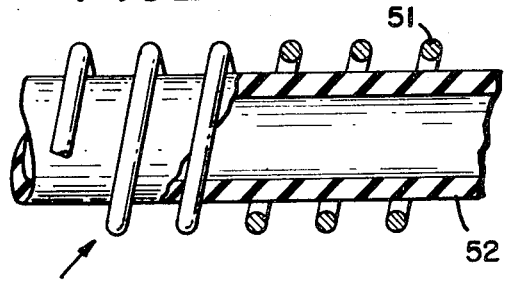
FIG_12
INVENTOR.
FREDERICK F. HORNE
ATTORNEYS

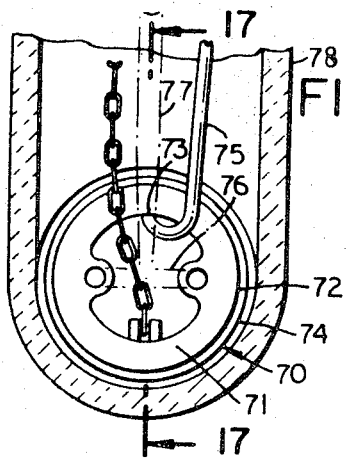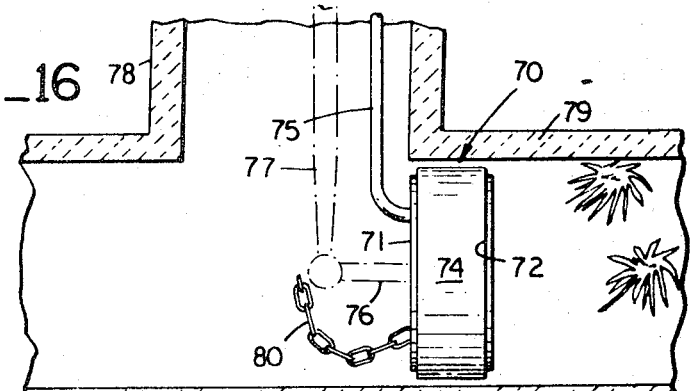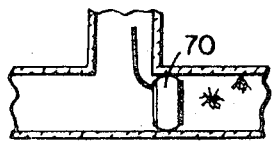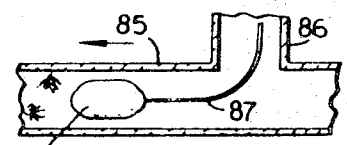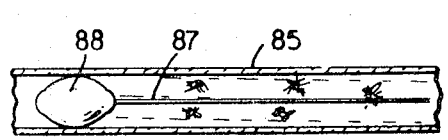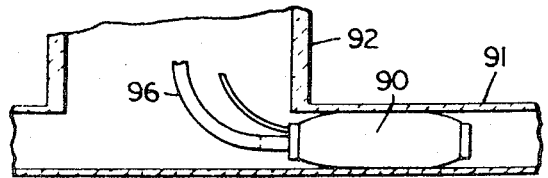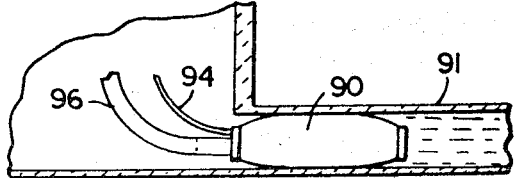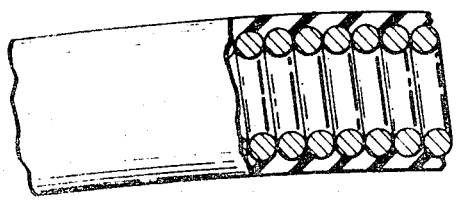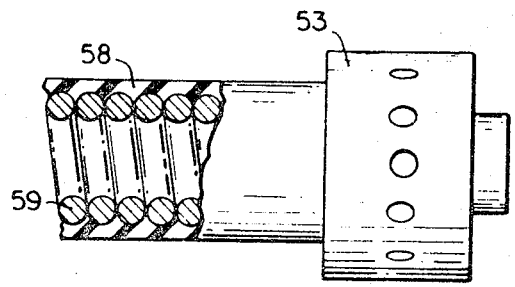

3,741,807
SEWER TREATMENT TO KILL TREE ROOTS AND OTHER ORGANIC GROWTH THEREWITHIN
Frederick F. Horne, Carmel Valley, Calif., assignor to Airrigation Engineering Company, Inc., Carmel Valley, Calif.
Continuation-in-part of application Ser. No. 850,321, Aug. 6, 1969, which is a continuation-in-part of application Ser. No. 760,822, Sept. 19, 1968, both now abandoned. This application Mar. 10, 1971, Ser. No. 122,738
Int. Cl. A01n 17/06; B08b 9/02
U.S. Cl. 134—24                    9 Claims

ABSTRACT OF THE DISCLOSURE

A composition for killing plant roots inside sewers, comprises an alkali metal alkyl dithiocarbamate in an amount of about 30%, a biodegradable liquid nonionic surfactant in an amount of about 12%, and water making up the remainder. One method for treating the sewer pipes comprises coating the inside wall of the pipe and any roots or other growth inside the pipe with the composition in the form of a foamy film by spraying it thereon or on the upper portion thereof, as from a continuously moving device. Preferred apparatus for so treating the sewer pipes comprises a sled having bottom skid means, a low center of gravity and a spray system mounted on said sled having generally upwardly directed nozzles, and means for pulling the sled through a pipe while supplying it with the composition under pressure. Another method comprises soaking with the solution diluted to about 2% of the methyldithiocarbamate, this being done by plugging the pipe and filling the pipe above the plug with the diluted solution. Special plugging apparatus is described.

---

This application is a continuation-in-part of application Ser. No. 850,321, filed Aug. 6, 1969, now abandoned, which was a continuation-in-part of application Ser. No. 760,822, filed Sept. 19, 1968, now abandoned.

This invention relates to the treatment of sewers and other conduits to control plant growth therein. It relates to novel compositions for use in the sewers to kill root growth therein; to novel and effective methods for application of this composition; and to apparatus by which the composition may be applied.

Many materials for controlling plant root growth in sewers and other drainage conduits have been tried, such as copper sulfate, which has been the most widely used chemical for this purpose over many years, but none of them has proven satisfactory in the long run. One of the main problems has been the fact that most tree roots come down from above, and such roots have not been affected by the treatments tried. The reasons for this ineffectiveness have been twofold: (1) the chemicals have been contained in and confined to the sewer water in the lower part of the pipe and therefore do not even touch the roots that lie above the sewer water; (2) such chemicals require a relatively long exposure to the roots to be effective, so that the only roots killed are those which remains for a long enough period in contact with the water containing such chemical agents. To explain further, sanitary sewers are designed to transport waste water at much less than the capacity of their conduits; hence, the waste water is normally in only the lower part of the pipe; thus, the copper sulfate and other herbicides and fungicides carried in the waste water under normal flow could be effective only in that lower part of the pipe where the roots may be in contact with the sewer water, and not elsewhere. However roots entering from above tend to die anyway when they reach the normal water flow line, due to the lack of oxygen in the sewage; these dead roots have practically no absorptive ability, but roots continue to grow above the flow line and to occupy and fill the major area of the pipe, eventually resulting in plugging. The prior art treatment materials may be potentially effective on any tree root which enters the sewer from below, but lack of oxygen generally prevents this from happening; so this limited effectiveness has been insufficient to prevent tree roots from plugging sewers. No composition carried by the sewer waste water has been able to keep the entire pipe free from roots, nor to rid the pipe from all roots. Moreover, no sufficiently effective method of sewer pipe treatment for this puropse has heretofore been found.

An excellent material for killing tree roots is sodium methyldithiocarbamate, a chemical heretofore used successfully as a soil fumigant and for some other things, but it did not prove to be as effective in sewers as one might expect; the vapors alone proved to be rather ineffectual. It was proposed that a chemical fire-extinguisher foam be used as an extender or carrier, and such chemical foam with the liquid fumigant entrained was injected into sewers; by the expansion pressure exerted, the fire-extinguisher foam was forced along the conduit and as the foam disintegrated, active gaseous fumigant was released. Improvement was, indeed, obtained by this expedient, but unfortunately this method required the conduit to be completely filled under expansive foam pressure in order to distribute the active fumigant to the surfaces to be treated, and this required extremely large volumes of both the chemical fire-extinguisher foam and the active agent, as well as pressure to push the foam through the pipe. Thus, that process was too expensive for general use. Moreover, the chemical fire-extinguisher foam itself tended to block the sewage flow, so that the sewer had to be taken out of service for extended periods during this treatment. Further, the charging into the pipes of the fire-extinguisher foam with the entrained active agent was a time-consuming operation, and the labor cost was not economically practical for large diameter or long conduits, especially when that cost was added to the materials cost of the large volume of chemical foam extender needed. Even then, many roots were not killed and remained.

Other investigations showed that, when sodium methyldithiocarbamate was introduced by spraying the pipe interior with a simple water solution, it tended to decompose too quickly from the water present to be fully effective. Also, the water solution of the active chemical readily ran down the pipe walls and quickly became part of the sewage flow, bypassing the roots above it. These investigations led me to believe that organic slime and other soils and greases were tending to protect many tree roots from surface absorption and treatment, so that they were not significantly damaged by what otherwise might be considered intensive treatment. Furthermore, the roots appeared to be protected in many instances by outer cell walls rich in cutin and suberin, which did not significantly imbibe either water or the fumigant solution in water. A closed television circuit which was lowered into sewers enabled the taking of pictures from outside the pipe as well as displaying an image of what was inside the sewer, and these pictures showed that many such roots were not killed even after very intensive treatment by water solutions containing sodium methyldithiocarbamate.

The present invention provides a solution to the problem. All roots within the sewer are killed, no matter from what direction they come and no matter at what level the waste water flows. Moreover, a new and economical use of the composition of this invention, makes it possible to kill these roots without killing or even damaging the same or other roots outside the sewer and without damaging the plants from which the roots come. However, to give longer protection, it is also possible, in instances where the joints of the pipe are damaged or leak to extend the killing action somewhat beyond the pipe interior, thereby delaying the regrowth considerably, still without substantially damaging the plants, because the material used herein is not a systemic plant poison.

Even more important, my new composition penetrates the cutin and suberin of the root walls, which are impermeable to untreated water, and carries the active material inside the root cells, so that the toxic effect is greatly enhanced. When used as a spray, my invention provides a novel small-bubble foam, which adheres to the roots. When used in a soak, more dilute solutions are quite effective. My new composition acts even on roots and other growths which are covered with slimes and greases, and it also cleans the roots and the pipe while killing these biological growths and the roots.

The chemical composition of this invention is a combination of standard alkali metal alkyl dithiocarbamate in its usual inert ingredients (e.g., water), with a biodegradable nonionic surfactant. This combination accomplishes what neither ingredient can do alone: neither the surfactant nor the dithiocarbamate, when used alone, kills a significant amount of sewer roots. However, the combination kills all or substantially all the sewer roots, when properly applied. Typical alkali metal alkyl dithiocarbamates usable in this invention and their formulas are:

sodium N-methyl dithiocarbamate

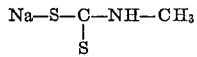

sodium N-ethyl dithiocarbamate

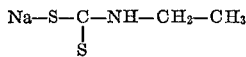

sodium N-isopropyl dithiocarbamate

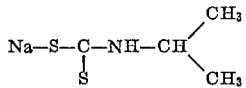

sodium N-propyl dithiocarbamate

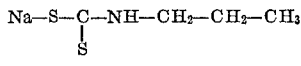

sodium N-allyl dithiocarbamate

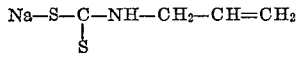

In each of the above, potassium may be substituted for sodium. So may other alkali metals, but the sodium and potassium compounds are the cheapest, the most soluble, and probably the best. The first compound named above, also called simply sodium methyl dithiocarbamate is the most volatile and is usually preferred.

A preferable class of surfactants usable in this invention is the alkyl aryl polyether alcohols and the ethers thereof. For example, an octylphenoxyethanol, such as a water-soluble iso-octyl phenoxy ethanol containing 10 moles of ethylene oxide (Triton X–100) has been proved very effective. Another alkylaryl polyether alcohol is Retzanol NP100, of Retzloff Chemical Co., a nonyl phenoxy polyoxyethylene ethanol, a clear liquid with a pour point below 0° C., a specific gravity of 1.06 at 25° C., soluble in water. Another is Tergitol NPX (Union Carbide) a nonyl phenyl polyethylene glycol ether.

By adding the surfactant in amounts of about 12½% (one eighth) of the volume of the regular fumigant mixture (a water solution having an active ingredient rating of about 36%, meaning a 36% aqueous solution of for example, sodium methyldithiocarbamate), a preferred concentrate formulation is obtained wherein the active ingredient, the sodium methyldithiocarbamate, is about 28 to 30% of the whole. In other words, my new composition may be distributed to buyers as a concentrate consisting of a water-soluble foam-type surface-active formulation, having about 30% of alkali methyldithiocarbamate, about 12% of the surfactant, and about 58% water. In more approximate figures, this concentrate is an aqueous solution of about three-tenth fumigant and one-eighth surfactant. There is about twice or thrice as much of the methyldithiocarbamate as of the surfactant, water making up the remainder. Other alkali metal alkyl dithiocarbamates are used in the same amounts.

Use may be by spray or by soaking, and for actual use, more water is added to the concentrate.

For spray application the concentrate is preferably diluted by three parts of water to one part of concentrate. The diluted spray material is thus about one-twelfth sodium methyldithiocarbamate and about one-thirtieth surfactant, and about nine-tenths water. This composition, when sprayed on or toward the sewer walls forms a foamy film that kills or materially inhibits the growth of all plant roots and other organic growth in the interior of the sewer. The surfactant in the spray composition does several things: (1) The surfactant acts to maintain the active fumigant for a sufficient time in an active foam state on the pipe and root surfaces; (2) it provides the foam, which adheres well to all surfaces instead of running down and dripping off ineffectually, as would a water spray; (3) the surfactant removes the coatings of slimes, greases, soaps, and dirt that cover and protect the roots; and, (4) it holds the fumigant on and near the cleaned roots and surfaces, where the fumigant can be most effective. As a result, only about one-sixth or one-seventh or even less of the alkali methyldithiocarbamate is used as when fire-extinguisher foam is used to fill the pipe, while the results are far, far more effective. Only the surfaces need be coated with the foamed fumigant spray solution, and in this invention that can be done quite efficiently.

In another treatment according to this invention, the fumigant-surfactant concentrate is further diluted, down to about one or two percent fumigant concentration, and then a length of the sewer pipe is filled and soaked. Here, again, the effectiveness is quite different from filling a sewer pipe with a water dilution of the fumigant alone at the same fumigant concentration. The surfactant acts to clean and expose the roots while the fumigant simultaneously attacks them. Penetration is assured by having both the surfactant and fumigant simultaneously present. The biological slimes, fatty acid soaps and greases, etc., are effectively emulsified and dispersed into the waste water flow, and the root cells are destroyed, causing the roots to decompose and slough off. By employing a pair of plugs and working with gravity from an upper level down, the same solution can be used in several successive soaking operations, thereby economizing in material, and for this purpose novel plugging apparatus and systems have been developed.

Especially in the soak-treatment, but also in the spray treatment, growth inhibitors may be incorporated to cause greater root die-back and to prolong the time during which no re-treatment is required. For this purpose, the only limitations on the use of any particular growth inhibitor (growth inhibitors being a well-known group of herbicides) are that it not be systemic, so as to poison the entire plant and kill it (through they may even be systemic to a degree, i.e., to kill roots back a few inches or so) and that there be no chemical reaction between the growth inhibitor and the fumigant or surfactant so as to nullify any of the ingredients. For example, 4-(methylsulphonyl)-2,6-dinitro - N,N - dipropyaniline, trifluralin (an approved common name for 2,6-dinitro-N,N-dipropyl-4-trifluoromethylaniline), dichlobenil (an approved common name for 2,6 dichlorobenzonitrile), and S-(O,O-diisopropyl phosphorodithioate) of N—(2 mercaptomethyl) benzenesulfonamide) have all been tied and have been found to give very satisfactory results, with root killbacks a few inches beyond the pipe walls. Also, where a pipe has breaks or its joints are broken or leak, the soap treatment sets up hydraulic pressure and, in conjunction with the growth inhibitor, extends the treatment beyond the interior of the pipe and considerably inhibits or delays regrowth, yet without significant damage to the plants themselves.

In some instances, it may be desirable to add a further treatment simultaneously to rid the sewer of insects, such as spiders, roaches, and sewer flies. Some of them may be killed by the fumigant, but other chemicals may be added to the solution to obtain a residual control, so long as they do not react with the other ingredients in a way that diminishes the activity and efficiency of any of the treating materials. Chlordane, DDT, diazinone, roach wettable powders and so on, may be added in effective amounts, as may some specific fungicides, if desired, so long as the added chemicals do not detrimentally react with the fumigant or surfactant (a growth inhibitor, if present) in the original solution.

My new composition is nonsystemic, so that it does not harm the plants themselves, but it does control all the roots which are in sewer mains or other conduits so treated, and it also helps to control any fungi, or bacteria such as produce slimes, and fatty acids. In this way, the generation of hydrogen sulfide in the sewers is reduced, and the roots and organic deposits are handled so effectively by my new composition that substantially no harmful residue remains. The gaseous fumigant itself is dissipated within a few hours, and the composition as a whole is readily biodegradable. Moreover, the biological slimes, fatty acids, etc., are effectively emulsified and dispersed into the waste water flow, and the root cells that are destroyed result in the decomposition and sloughing off of the roots, which are thus carried down the sewer.

To illustrate the biological effectiveness of the invention, a sample of the solution, diluted to (20.4% active sodium methyldithiocarbamate) was bioassayed in comparison to the standard solution (32.7% active material). The procedure followed was to dilute each solution with three parts water and then place 0.1 ml. of the diluted solution into vials containing 9.9 ml. of sterile Difco bacto-malt broth or bacto-nutrient broth. The broth was then inoculated with spore suspensions of *Aspergillus niger, Penicillium italicum, Escherichia coli,* and *Staphylococcus aureus.* The vials were sealed and, after one week, observations were made on the growth of the organisms in the vial. All vials inoculated with both formulations remained clear and no growth of the organisms occurred. The growth of the fungi and bacteria in untreated vials was heavy.

As stated earlier one method of application includes spraying my new composition, with the concentrate diluted by about three parts of water to one of the composition. The spray impinges a small bubble foam upon the surfaces inside the pipe by directing the spray upwardly while moving the spray apparatus, preferably at a substantially constant rate through the pipe and while maintaining the spray nozzles in a proper orientation, so that the spray is directed upon the upper portion of the pipe and roots and slimes and other growth, above the normal level of the waste water flow. Much of the foam adheres where it impinges, while some of the material runs down the pipe walls into the waste water and is also effective there. The small bubble foam slowly releases the active fumigant and fills the pipe with the toxic vapor, so that the whole inside volume is treated effectively with the fumigant.

The spraying apparatus of the invention may include a set of pressure tanks for the solution of this invention interconnected with an inlet manifold and suitable valves which control a gas supply and terminate in the side opening of a T connection. The tanks may be interconnected through a discharge manifold to a reel-mounted pressure hose through an appropriate swivel fitting. A sled-mounted spray assembly of a size able to pass through the sewer is equipped with a pair of atomizer nozzles with orifices, one leading forward, the other to the rear, which apply the solution at a suitable rate, such as a quarter of a gallon of diluted solution per minute at a pressure of a hundred pounds per square inch. The sled-mounted spray assembly may be connected to the pressure hose, a valve opened (preferably at the sled) and the spray assembly and hose may, while spraying, be drawn through a sewer by a cable or power rod to an end of the desired run, which may be the next manhole; then the valve may be closed, the sled may be removed, and the hose withdrawn. The mixture automatically forms the desired surface-active fumigant, and the spray places the small-bubble foam in contact with all portions of the pipe interior and with all roots inside the pipe. The surface film stays as a foam for a time long enough for full contact and activity by the chemicals involved, without remaining longer than necessary.

Other objects and advantages of the invention will appear from the following description of a preferred form thereof.

In the drawings:

FIG. 1 is a view in side elevation of a trailer-mounted apparatus comprising part of a sewer-spraying apparatus embodying the principles of the invention.

FIG. 2 is a view in front elevation of the apparatus of FIG. 1.

FIG. 3 is a top plan view of a sled and nozzle assembly that may be used in conjunction with the apparatus of FIGS. 1 and 2 in this invention. Alternative "on" and "off" positions of the shut-off valve are shown, one position being shown in solid lines, the other position being shown in broken lines.

FIG. 4 is a view in side elevation of the sled and nozzle assembly of FIG. 3.

FIG. 5 is a view in vertical cross section of a pipe afflicted with roots which, if they grow too massive, will eventually plug the pipe or break the pipe joint, causing infiltration.

FIG. 6 is a similar view showing the sled moving through the pipe of FIG. 5 and spraying it.

FIG. 7 is a fragmentary view in side elevation and in section taken along the line 7—7 of FIG. 6 showing the spray acting.

FIG. 8 is a view on a smaller scale than FIG. 7 showing the assembly of FIG. 3 passing through the pipe and how it is being pulled by cable or power rod. The pipe is broken in the middle to conserve space.

FIG. 9 is a view somewhat similar to FIG. 8 of a modified form of the invention in which a combination cable-hose assembly is inserted through one manhole and pushed to the next manhole, where it is attached to a sled assembly generally like that of FIG. 3.

FIG. 10 is a view similar to FIG. 9, showing the apparatus of FIG. 9 in use.

FIG. 11 is a view similar to FIG. 10 with a modified form of nozzle on the end of the combination cable-hose.

FIG. 12 is an enlarged fragmentary view in elevation and in section of a cable-conduit combination in which a coil spring encircles a relatively thin-walled plastic conduit.

FIG. 13 is a view similar to FIG. 12 of a modification of the previous unit in which a coil spring cable is inside the conduit.

FIG. 14 is a view of the cable-conduit combination of FIG. 13 with a simple nozzle arrangement attached to one end thereof for use in situations like that of FIG. 11.

FIG. 15 is a view similar to FIG. 14 of a modified form of cable-conduit combination.

FIG. 16 is a fragmentary view in section of a portion of a sewer and a manhole, with a plug according to the invention in place for practice of the soaking method of the invention, prior to inflation of the plug.

FIG. 17 is a view in section taken along the line 17—17 in FIG. 16.

FIG. 18 is a view similar to FIG. 16 with the plug inflated to seal off the pipe.

FIG. 19 is a similar view showing the pipe above the plug filled with the soaking solution of this invention.

FIG. 20 is a view similar to FIG. 21 showing the insertion in a branch sewer line of an inflatable plug according to the invention, through a house clean-out.

FIG. 21 is a similar view with the plug inserted and inflated and the branch line filled.

FIG. 22 is a view generally similar to FIG. 16 of a modified form of main-sealing plug with a pumping conduit attached thereto.

FIG. 23 is a similar view of the plug of FIG. 22 in use.

The spray method of the present invention involves coating all surfaces inside a pipe to be treated, with an atomized dilute water solution of the fumigant vapor and surfactant, so that there is an active foam on all the surfaces inside the pipe, including the pipe surfaces, the root surfaces, and the slime-covered surfaces. This coating is done preferably by directing a spray of the material toward the upper portion of the pipe so as to get direct impingement on the roots that tend to grow in the upper portion of the pipe above the normal liquid flow, an area which is more difficult to treat than those areas that can be reached by active agents in the waste water or sewage flow. The active material is deflected and flows down along the pipe walls and other surfaces to cover all the surfaces, including that of the waste water, with foam sufficient for active treatment of the slime, grease and roots in the bottom porion of the pipe. Immediately, the nonionic surfactant carries the alkali metal alkyldithiocarbamate through the water-excluding outer walls of the root into the root and kills the cells therein, and if the root is coated with slime or grease, the surfactant penetrates that too and washes it off, always carrying the fumigant with it. The small bubble foam of this invention has been found to be more stable and to adhere to the surfaces of the roots and other organic material longer than can large-bubble foams, such as fire-extinguisher foam. Treatment of the roots thus is much more efficient because the toxic vapor is held in close proximity to the root cells or surfaces, and also because the foam-forming surfactant is active in cleaning, exposing and penetrating the surfaces—which fire-extinguisher foam is unable to do.

This spray method may be accomplished with the aid of the apparatus shown in FIGS. 1–4, some parts of which are moved along inside the pipe while the other parts remain outside. FIGS. 1 and 2 show the outside portion of a preferable apparatus, including a trailer 10 having a pair of wheels 11 and carrying a reel 12 of hose 13 and also a set of four tanks 14, 15, 16 (and one not seen in the drawings), which contain the diluted active solution. One end of each of the tanks 14, 15, 16 (and the one not shown) may be connected by a T 17 and a pressure gauge 18 to an inlet manifold 20, and the tanks' opposite ends may be connected by conduits 21 to an outlet manifold 22. The manifold 22 may be connected by a central conduit 23 that extends through the reel 12 to the hose 13 and by the hose 13 to the nozzles 31 and 32 on the sled 30, shown in FIGS. 3 and 4.

The pair of atomizer nozzles 31 and 32 are both located approximately at the middle of the sled 30 at a sled manifold 33. The sled 20 has a skid base 34, which may be a generally semi-circular shell, for example, defining the lower surface of the sled with front and rear upward ends 35 and 36, and the center of gravity is kept low, so that the sled 30 rides low along the lower surface of the pipe 25; consequently, the sprays 37 and 38, from the nozzles 31 and 32 are directed generally upwardly, as shown in the drawings. Curved guard rods 39 extend across the sled 30 and protect the manifold 33 and nozzles 31 and 32, helping also to support them. The root-treating liquid is sent into the sled-borne manifold 33 at sufficient pressure, e.g., 110 to 125 p.s.i., to emit the desired sprays 37 and 38, as by impelling the liquid by nitrogen or other suitable gas under high pressure. A shut-off valve 40 is provided closely adjacent the manifold 33, with a lever 41 that may be actuated from the street above by pulling on a chain 42 to open the valve 40 or on a cable 43 to close the valve.

As shown in FIGS. 5 and 6, the root growth 26 occurs only at joints or cracks and tends mainly to be in the upper portion of the pipe 25 (since generally roots cannot live in the oxygen-depleted waste water in the lower portion). This growth 26 is contacted, by the sprays 37 and 38, and the surfactant acts immediately to remove grease, slime, and other things that might slow the toxic effect upon the roots by the fumigant, while also helping to form a surface-active film in the nature of a small bubble foam on all surfaces inside the pipe 25. The atomized fumigant solution then is in contact with the roots 26 and acts to release its fungicidal and phytocidal chemicals, largely as vapors; these act in a non-systemic manner to kill only the root portions to which they are actually exposed in the sewer.

The sled 30 may have two rings 44 and 45, one at each end. The ring 44 may be attached to a cable or wire rope 46 which is used to pull the sled 30 through the pipe 25. The ring 45 may be attached to a drag line 47 to enable pulling back on the sled 30, should it encounter an obstacle in the pipe preventing its forward movement. The cable 46 may be secured to the end of a conventional mechanical rodding device after the rod is driven from one manhole 48 to the next manhole 49. There, the sled 30 with the cable 46 attached to the rod is pulled back through the pipe 25 by the cable 46 and power rod from the manhole 49 to the manhole 48, and the hose 13 and dragline 47 follow along, the hose 13 unreeling as it goes.

The chain 42 is pulled to move the lever 41 to open the valve 40, and then the nozzles 31 and 32 are fed continuously with the treating solution, while the sled 30 is moved through the pipe 25 at a substantially constant rate of speed and with substantially constant output. Thereby, the full reaction is obtained and the material is dispersed and acts.

When the sled 30 reaches the manhole 48 and is pulled out by the cable 46, it is detached from the hose 13, and the hose 13 and dragline 47 are then pulled back through and out from the manhole 46. The pipe 25 and all other surfaces between the manholes 48 and 49 have then been coated with a foamy film of small bubbles, which includes the fumigant and surfactant. The fumigant attacks the roots and organic growth generally, and the surfactant carries the fumigant into the inner cells of the roots and attacks grease, slime, and dirt, freeing it from the pipe and from roots and exposing them, rendering the roots liable to attack by the fumigant, which displaces the normal sewer atmosphere and is also held in the small bubble foam.

In some installations the power rod and cable 46 and dragline 47 may not be needed. In which case, the power rod and cable 46 may be replaced by a coil spring cable and hose combination 50 as shown in FIG. 9, the coil spring cable 51 serving to carry the hose 52 through the pipe and to return it and the sled 30 while the spraying is done. It is feasible in short side-lines, and especially small-diameter ones, to use a coil spring cable hose unit 50, wherein the hose 52 is surrounded by the coil spring cable 51 and is provided with a suitable spray device 53 (FIGS. 11 and 14) at one end, and to send that out to a desired length and then to spray while pulling the cable-hose unit back.

The cable-conduit unit 50 may be like that shown in FIG. 12 in which a coil spring cable 51 is employed with a thin walled plastic conduit 52 inside it. On the other hand, it may be a unit like the unit 55 shown in FIGS. 13 and 14 in which a coil spring cable 56 is inside the conduit 57. In fact, as shown in FIG. 15, a conduit 58 may be molded around a close-wound coil spring cable 59, the rubber filling the outer cavities between successive coils.

The basic point here is that the cable and conduit are made a unit so that it becomes possible to do the pulling with the very unit which is applying the liquid.

The structure may be used as shown in FIGS. 9 and 10 by inserting the cable-hose unit 50 into a pipe 60 via a manhole 61 and driving the cable forward to the next manhole 61, then attaching to it the sled 30 and then, as in FIG. 10, pulling the sled 30 along while spraying and then removing the sled 30 from the first manhole 61.

Another way of using this device with results that are satisfactory for some uses is to install the simple nozzle 53 on the end of a cable-conduit unit 50 or 55 and then pushing the unit 50 or 55 wherever desired and then pulling it back while spraying. In such instance, if the spray is such that it cannot be maintained in a stable position, it may be provided with openings all around so that the spray will reach all portions of the pipe. Naturally, this is somewhat less efficient than with the use of the sled as given before, but it is a feasible way of operating in situations where the sled cannot be used.

In using the soaking process, the outside apparatus can be very simple. A container and a hose, a source of air pressure (even a hand pump, or a motor compressor), are about all that is needed. For the apparatus of FIGS. 22 and 23, a pump is required. The concentrate is diluted to a fumigant concentration of less than 5%, preferably 1% or 2%. Either 1% or 2% is effective, but 2% is quicker and saves time.

After determining which of the collection lines have known root problems, the operator should start with the first manhole section in the upstream end of the line, preferably where there are four or five sections downstream on the same sewer collection line which can be soaked progressively with the same solution by passing the solution downstream. This is for economy reasons. Unless several sections can be soaked successively with the same solution, the soaking method will be less economical.

There are several ways of plugging the sewer. In the system shown in FIGS. 16–19 a plug 70 is used which has a metal body 71 with a rim 72 to which a conduit 73 leads. A rubber diaphragm 74 is either sealed to the rim 73 or is made as a collapsible tube connected to the conduit 73. An air hose 75 is attached to the conduit 73. A bracket 76 enables installation by a pole-like tool 77, so that the plug 70 can be lowered in a manhole 78 to a sewer pipe 73 and located in the end. After use, a chain 80 is used to pull the plug out and enable its recapture. With the plug 70 in place, it is supplied with compressed air through the hose 75 and conduit 73 and the diaphragm 74 is inflated, as in FIG. 18 to seal the downstream end of the sewer 79. Going to the manhole next upstream, the dilute 1% or 2% solution is put in through a hose to substantially fill a desired pipe sector. An alternate way of obtaining this result is to add water to the upstream manhole of this section at the rate of approximately 40 gallons a minute and while this water is being added to the manhole, add enough of the concentrate of this invention to assure that the required amount of water to fill the section of the main and the taps will produce the desired 2% solution. For example, assuming that the first section to be soaked is a 6-inch main, 400 feet in length, it will require 1.6 gallons of water per foot, or 640 gallons, to fill the main, and a 2% solution of fumigant will require the addition of 12.8 gallons of the concentrate.

After this solution has been allowed to stand in the line for at least thirty minutes, and preferably for an hour, then the next downstream manhole should have the main plugged by a second plug like the plug 70; then the upstream plug 70 is removed by deflating the diaphragm 74, pulling on the chain 80, and lifting it out by the pole 77. The dilute fumigant solution flows downstream to fill the next section of the line. Again, this reused batch of solution should remain in the line for thirty minutes to an hour. By following this method of passing the same batch of solution down line for four or five sections of line, it is feasible to use the same batch of solution to treat 1500 to 2000 feet of line at a total cost for concentrate of about 5¢ to 7¢ per lineal foot.

The spray method, as described above, is still necessary to treat sewers that are impractical to soak, due to the location of the root problem, or where the same batch cannot be used in several downstream root-infested lines, or where it is not practical to fill the sewer line because of potential flooding of household systems or basements.

FIGS. 20 and 21 show the soaking system as applied to a branch sewer line 85 as from a house to the main. A clean-out 86 is used in lieu of a manhole, and a cable-conduit 87 like the one in FIG. 15 is used to insert an inflatable plug 88. After the desired length of sewer line 85 has been determined, the cable-conduit 87 and plug 88 are inserted to that length, and then compressed air is sent through the cable-conduit 87 to inflate the plug 88. After treatment, the solution may be released. If desired, before release a plug may be inserted from the manhole at the street. Or, if desired, the used solution may be pumped out from the clean-out 86 through a suitable hose (not shown).

FIGS. 22 and 23 show how a similar plug 90 can be used in a sewer 91, with insertion through a manhole 92. The plug 90 has a rubber diaphragm 93 that is inflatable through a hose 94. The plug 90 also has a central tube 95 that extends out both ends, and one end is sealed from that side by the affixation of a hose 96. In this instance, the plug 90 is inserted on the downstream end of a desired length of sewer 91, the diaphragm 93 inflated, and then solution is sent in through the hose 96. After a half-hour or hour, the solution is pumped out by a pump up above the manhole 92. The solution may then be reused at another location by repeating the same procedure.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

As pointed out earlier, both the spray method and the soaking method have been given extensive and successful trials in city sewers and have worked. One city that uses a closed-circuit television camera inside the sewers with a screen outside the sewers has been able to see the effectiveness by comparisons of the state of the sewer before application with its state afterwards.

Filling the pipe with the solution of this invention develops a hydrostatic pressure, especially when the sewer pipe is at or above the recommended minimum grade of four inches per one hundred feet, and this hydrostatic pressure enhances the absorption of the solution by root membranes by overcoming the turgor of the root cells. It has been found that a one-percent solution of the material held for fifteen minutes killed all the roots inside the pipe, and exfiltrated wherever there was a separation or break in the pipe to kill back the roots a few inches, thereby extending the period needed between treatments.

I claim:

1. A method for treating sewer pipe and the like for killing roots and other organic materials therein and keeping the pipes relatively clear and clean, comprising
coating the surfaces inside the pipe for a toxic time interval with a film of an effective amount of a stable, clinging foam-mixture of phytocidal fumigant and nonionic surfactant.

2. The method of claim 1 wherein the coating is done by spraying said mixture from a moving device while directing the spray against the upper portion of the pipe.

3. The method of claim 1 wherein the fumigant is an alkali metal alkyldithiocarbamate.

4. A method for treating sewer pipes and the like for killing roots and other organic materials therein and keeping the pipes relatively clear and clean, comprising coating the surfaces inside the pipe for a toxic time interval with a foamy film comprising an effective amount of a composition consisting essentially of as active ingredients about five parts of an alkali metal alkyl dithiocarbamate to about two parts of biodegradable liquid nonionic surfactant, said alkyl dithiocarbamate being chosen from the class consisting of the sodium and potassium methyl, ethyl, propyl, isopropyl and allyl dithiocarbamates and mixtures thereof with each other and said surfactant being taken from the class consisting of iso-octyl phenoxy ethanol, nonyl phenoxy polyoxyethylene ethanol and nonyl phenyl polyethylene glycol ether.

5. The method of claim 4 where the composition is dissolved in water.

6. The method of claim 4 wherein the coating is done by spraying said mixture from a moving device while directing the spray against the upper portion of the pipe.

7. The method of claim 4 wherein the fumigant is an alkali metal alkyldithiocarbamate.

8. The method of claim 4 further including an effective amount of plant growth inhibitor which does not react chemically with said active ingredients.

9. The method of claim 8 wherein said inhibitor is taken from the class consisting of 4-(methylsulfonyl)-2,6-dinitro-N,N-dipropylaniline, trifluralin, and dichlobenil.

References Cited
UNITED STATES PATENTS

| | | | |
|---|---|---|---|
| 2,763,288 | 9/1956 | Tharp | 134—24 X |
| 3,635,230 | 1/1972 | Kirschke | 134—24 X |
| 2,976,191 | 3/1961 | Weston | 134—24 |

MORRIS O. WOLK, Primary Examiner

D. G. MILLMAN, Assistant Examiner

U.S. Cl. X.R.

71—65, 87, 101, 103, 105, 121, DIG. 1; 134—22 C